Dec. 31, 1968  H. H. GARIG  3,419,690
VIBRATION MONITORS

Filed Nov. 4, 1966

INVENTOR
Henry H. Garig

BY Stone & Marks
ATTORNEY.

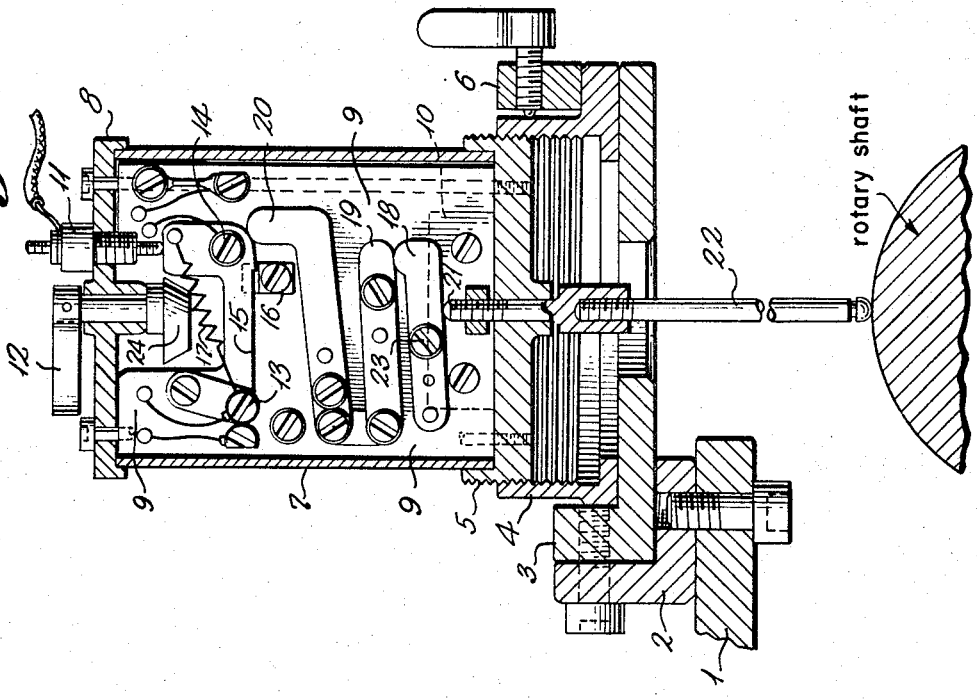
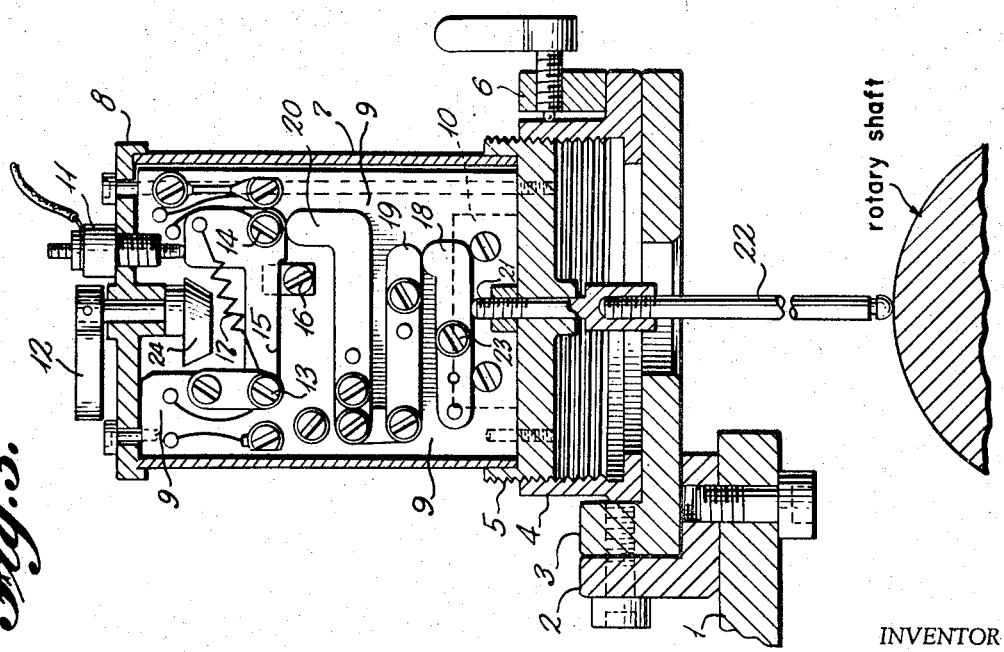

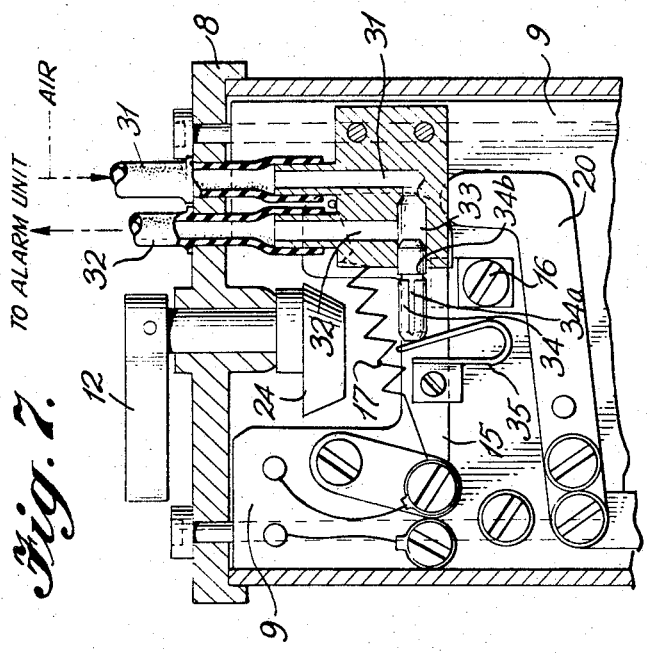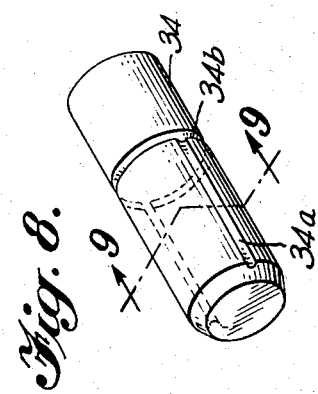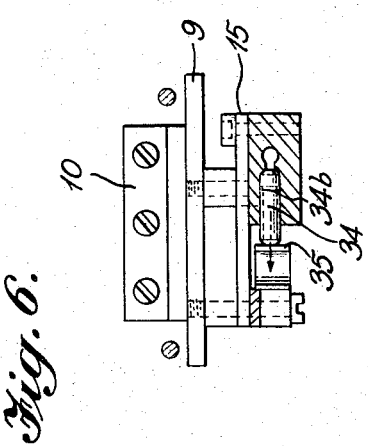

United States Patent Office 3,419,690
Patented Dec. 31, 1968

3,419,690
VIBRATION MONITORS
Henry H. Garig, Norwood, La.,
(785 Robindale Road, Brownsville, Tex. 78520)
Filed Nov. 4, 1966, Ser. No. 592,051
7 Claims. (Cl. 200—61.45)

This invention relates to mechanism and to a method of operating such mechanism for the purpose of detecting small relative motions of machinery or mechanical equipment and amplifying this detection to a usable size for alarms or other indications. In effect, this device is a vibration monitor.

In any piece of rotating machinery there is a certain degree of out of balance movement. When small, no notice is taken of such movement as it is absorbed in the bearing journal clearance. When some influence causes this motion or movement to exceed the normal amount, the rotating element contacts stationary parts causing damage and destruction unless early warning and immediate shut-down can be effected.

The vibration monitor of this invention is designed to give warning and/or through suitable controls to effect the shut-down of the machine. The present day devices such as are generally known depend on their being shaken after the manner of a cocktail shaker and tripping by presence of inertia in certain parts, and also by varying of a magnetic air gap resultant of such shaking and the like. The disadvantage in the foregoing is that ambient vibration can trip the alarm, thus making them most difficult to use on board a ship, aircraft or other location where harmless ambient vibration or motion is present. Under these conditions calibrations for a desired degree of alarming vibration is very difficult and unreliable.

The vibration monitor of this invention preferably has a cylindrical casing through the bottom of which there extends centrally and downwardly a push rod which is in contact with levers and contact elements located in the upper portion of the casing. This is the preferable arrangement of such parts but the construction is not necessarily limited to this arrangement. The push rod is connected to a contact rod which has its lower end close to a shaft or other machinery parts as will be described further on in this specification. The upper portion of the cylindrical casing contains a series of levers and contact elements. The exterior of the casing is provided with calibrations on the surface extending around the base of the cylinder.

The foregoing and additional details of construction and use will be set forth in the following specification and claims when considered in connection with the drawings in which:

FIG. 3 is an interior view of the vibration monitor shown in FIG. 1 illustrating the mounting of the various levers and the contact with the contact rod as it extends downwardly and centrally from the lowermost internal lever; and FIG. 4 is a view of the equipment shown in FIG. 3 but with the vibration monitor in tripped position;

FIG. 5 is a view of a modification of one species of the structure shown in FIG. 3 according to which air pressure operates a piston which is spring held and showing the piston in the retracted position;

FIG. 6 is a sectional view of the piston and spring taken on the line 6—6 of FIG. 5, looking in the direction of the arrows;

FIG. 7 is a view similar to FIG. 5 but with the piston advanced and thrusting against the spring;

FIG. 8 is an enlarged view of the piston shown in FIGS. 5, 6 and 7 and illustrating the grooves on the exterior of the piston; and FIG. 9 is a sectional view of the piston taken on the line 9—9 of FIG. 8.

Figure 2:
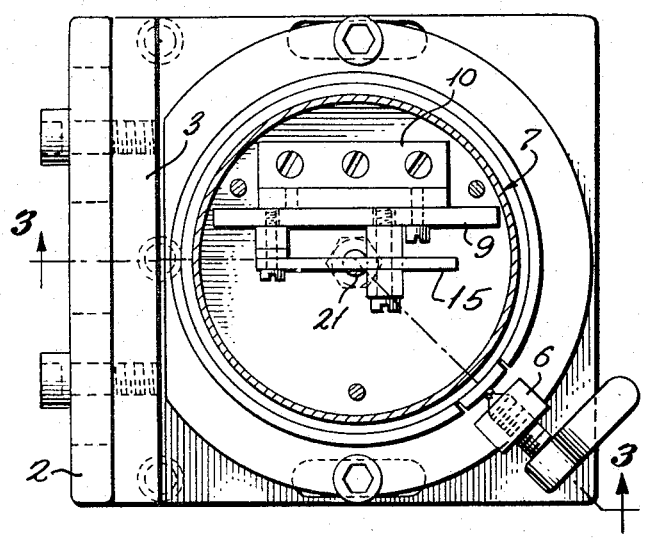
FIG. 2 is a top plan view of the structure shown in FIG. 1 with the cap 8 removed.
Figure 1:
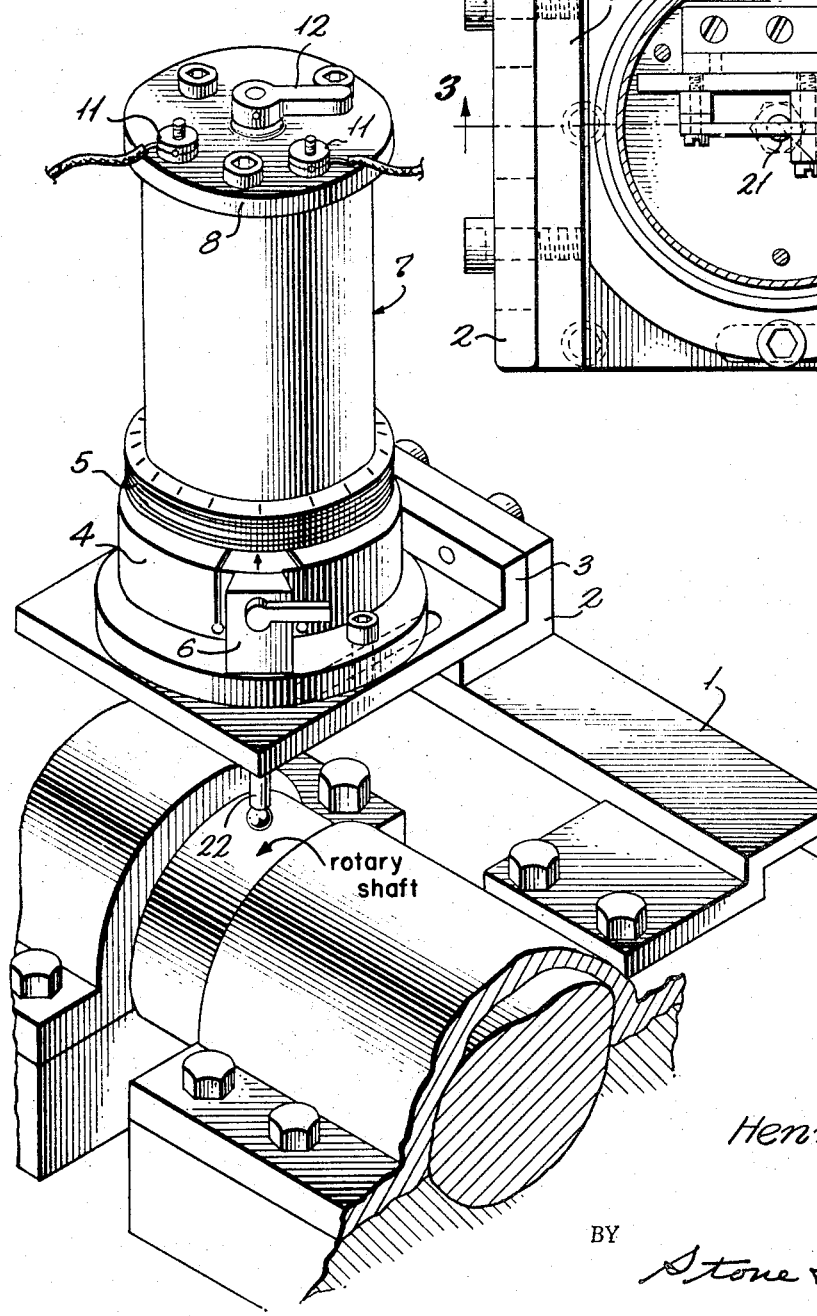
FIG. 1 is a perspective view of the exterior of the vibration monitor and its mounting.

INDEX
1—Fixed mount
2—Intermediate mount
3—Adjusting mount
4—Instrument base
5—Calibration ring
6—Adjustment lock
7—Instrument case
8—Instrument cap
9—Lever support plate
10—Plate base
11—Terminal (signal outlet)
12—Reset lever
13—Contacts
14—Contacts (closed)
15—Carrier
16—Latch
17—Spring
18—Lever
19—Lever
20—Lever
21—Link on upper end of
22—Internal push rod
23—Pivot for lever 18
24—Cam
31—Intake pipe
32—Outlet or exhaust pipe
33—Valve piston cylinder
34—Valve piston
34ª—Encircling groove
34ᵇ—Longitudinally extending grooves
35—Spring Referring in detail to the several figures of the drawings, it will be observed that the lower end of the contact rod 22 rides in close proximity to a rotatable shaft which extends from a bearing housing. The fixed mount 1 is a metal or other suitable product capable of some lateral and vertical adjustment. Lateral adjustment is also made by the use of elongated holes in the part 2 constituting an intermediate mount and in part 3 which constitutes an adjusting mount. Final and minute vertical adjustment is made by the threaded portions of the elements 4 constituting an instrument base and 5 constituting a calibration ring where a twenty (20) thread per inch will render 0.001 vertical movement for each of fifty (50) calibration marks shown on the calibration ring 5. The unit is so mounted and preliminarily adjusted while the turbine or other type of rotating shaft constituting a pump is shut down and cold.

When the turbine is started up and at normal temperature and expansion, the final adjustment is made by screwing the calibration ring 5 down into the instrument base 4 until the rod 22 touches the rotatable shaft. This can be detected by the feel of a finger on the rod 22 after which the rod 22 is raised from contact with the rotatable shaft for the desired clearance, for example 0.002 of an inch by screwing the calibration ring 5 back two (2) of the calibration marks on the calibration ring 5.

In the operation of this vibration monitor, if out of balance occurs, vibration on the part of the rotatable shaft takes place and it will be observed when the rotary shaft strikes the lower end of the rod 22 forcing it and the push rod 21 upward against the compound lever arrangement of the lever elements 18, 19 and 20, which in turn force the carrier 15 off of its latch 16. Then the spring 17 pulls the carrier 15 to the left, closing the electrical contacts or valve 13. Next a warning signal will be transmitted to an externally located alarm through terminals 11. In case of locations in refineries or in pump rooms where a flammable gas may be present, a miniature air valve can be used in lieu of the electrical contacts as shown in FIGS. 5, 6, and 7. It will be noted that contacts 14 are for use if a normally closed circuit is desired.

For transient or test tripping, a cam 24 with the reset lever 12 is installed for resetting the levers by turning the cam against the upper left shoulder of the carrier 15.

The method of advancing or retarding the threaded base of the calibration ring 5 to which the device is secured and having this ring calibrated with indicator marks which, when compared with the stationary marks on the adjustment lock 6 renders a definite knowledge of the exact position of the contact rod 22 in relation to the desired amount of motion of the monitored item to cause tripping. The segmented portion of the instrument base 4 with the thumb screw adjustment lock 6 insures that the instrument will stay in the position as set. The combination and shapes of the levers 18, 19 and 20 and carrier 15 will remain hard set on its latch 16 until tripped by the tips of the lever 20, then moved to actuate said alarm circuits whether they be electrical or operated by compressed gas.

The design and use of the tapered cam 24 serves to reset the carrier 15.

By reference to FIG. 2 which is a view looking downward into the interior of the instrument case after the top cap has been removed, it will be observed that the various levers are mounted on a plate 9 which extends substantially transversely across the center of the case 7. The plate 9 thus is mounted to extend vertically on its edge across the interior of the case 7 and the several levers within the case are shown in FIGS. 3 and 4 as mounted on the plate 9 by means of pin pivots such as those provided with screw heads for the mounting of the levers 18, 19 and 20. The plate 9 is secured to base 10 by suitable screws.

With further reference to the use of air and air valve means to provide a warning signal, attention is directed to the FIGS. 5 to 9. FIG. 5 is an enlarged side view of a vertical central section of the upper portion of FIG. 3 modified from the lever element 20 upwardly to substitute fluid pressure in lieu of the electric means shown in FIG. 3. According to this change, an intake pipe 31, having a suitable valve and control handle, not shown, serves to introduce either air or fluid pressure of some other type. An outlet or exhaust pipe 32 leads from a valve piston cylinder 33. Within said cylinder 33 is a valve piston 34 which bears against a spring 35. In this modification the carrier 15 of FIG. 3 is modified as shown in FIG. 5. The exterior of the valve piston 34 is preferably provided with an encircling groove 34$^a$ which is connected with longitudinally extending grooves 34$^b$ leading from the groove 34$^a$ to the rear end of the piston 34. This is to provide a "leak off" to permit discharge to the atmosphere in order to prevent a gradual build up of pressure in the alarm circuit if the valve seat should leak. It will be noted from FIGS. 5 and 7 that the groove 34$^a$ may be in line with the discharge exhaust pipe 32.

FIG. 6 is a fragmentary view providing a sectional view of the piston and spring taken on the line 6—6 of FIG. 5 looking in the direction of the arrows. It is thus a top plan view looking downwardly on the cylinder 33 and valve piston 34.

FIG. 7 is a view similar to FIG. 5 but the valve piston is in the retracted position under the influence of the spring 17 and inlet air pressure.

FIG. 8 is an enlarged view of the piston shown in FIGS. 5, 6 and 7 and illustrating the grooves 34$^a$ and 34$^b$ on the exterior of the piston 34.

FIG. 9 is a sectional view taken on the line 9—9 of FIG. 8, considerably enlarged and showing the longitudinal grooves 34$^a$ at opposite sides of the piston and in dotted lines showing the depth of the groove 34$^b$.

It will be understood that the valve and its mounting on the plate 9 is accomplished by use of a spacer which is held in front of the carrier 15 where its valve stem contacts a U-shaped leaf spring which is carried by a block screwed to the carrier 15. The spring will hold the valve on its seat against the inlet air pressure until the carrier is tripped and moves to the left lessening the spring pressure to allow air pressure to pass under the seat and out through the air outlet connection where it can be used to energize an alarm or shut down the equipment.

Among the advantages which arise from the above mentioned equipment are the following:

(a) Ambient vibration has no effect on tripping or operation.

(b) Positive calibration can be adjusted to any desired degree of allowable vibration.

(c) Frequency of vibration has no effect.

(d) The foregoing mechanism may be constructed of the commonly used metals for any surrounding, even when submerged in liquids or gases (using an air circuit). The structure can be made substantially corrosion proof.

(e) This mechanism may be easily tested merely by hand lifting the rod 22.

(f) The mechanism need not be made delicate or supersensitive inasmuch as the forces exerted by an unbalanced shaft are large.

(g) No ambient vibration will cause slipping of the adjustment as the locking assembly 6 will lock even tighter due to the position of the lever in locked position.

(h) The unit with a few adjutments can be mounted in any position.

(i) The unit can be made for use in the presence of temperature extremes.

(j) The present size of vibration monitor as illustrated is suitable for the average industrial machine, but for special applications the size can be varied to suit, and extensions to the contact rod 22 made of various shapes and leverages used to monitor difficult to reach rotating shafts or other pieces of equipment.

(k) In instances in which some unwarranted motion is to be monitored, such as the movement of an entire piece of equipment, the monitor can be mounted on independent and adjacent structure and adjusted to any degree.

I claim:

1. A vibration monitor for use with rotating machinery comprising a casing, a train of levers within said casing one above the other, and a push rod extending outwardly from said casing and adapted to have its extreme outer end to engage a rotatable machine part, the lowermost of said levers engaging the upper end of said push rod, the lower end of said casing being seated in a base ring provided with calibrations therearound, said base ring being fitted for vertical adjustment in a fixed base, the uppermost of said train of levers serving to close an electric circuit to the exterior of said casing when said push rod is pushed upwardly.

2. A vibration monitor of the type defined in claim 1 for use with rotating machinery, comprising a casing, lever means within said casing adapted to transmit a blow from without said casing to electrical contact means within said casing, and a push rod extending outwardly from said casing and adapted to have its extreme outer end to engage a rotatable machine part, the lowermost of said levers engaging the upper end of said push rod, the lower end of said casing being seated in a base ring provided with calibrations therearound, said base ring being fitted for vertical adjustment in a fixed base, the uppermost of said series of levers serving to close an electric circuit to the exterior of said casing when said push rod is pushed upwardly.

3. A vibration monitor of the type defined in claim 1 for use with rotating machinery, comprising a casing, a series of levers within said casing, one above the other, and a push rod extending out of said casing and adapted to have its extreme outer end to engage a rotatable machine part, the lowermost of said levers being adapted to engage the upper end of said push rod, the lower end of said casing being seated in a base ring provided with calibrations therearound, said base ring being fitted for vertical adjustment in a fixed base, the uppermost of said levers being adapted to conduct a charge of electricity to the exterior of the casing when the push rod is pushed upwardly resulting from vibration in the machine part engaged by said push rod.

4. A vibration monitor of the type defined in claim 1 for use with rotating machinery, comprising a casing, a train of levers within said casing one above the other, and a push rod extending outwardly from said casing and adapted to have its extreme outer end to engage a rotatable machine part, the lowermost of said levers engaging the upper end of said push rod, the lower end of said casing being seated in a base ring provided with calibrations therearound, said base ring being fitted for vertical adjustment in a fixed base, the uppermost of said train of levers serving to pass an electrical charge to a point exteriorly of said casing when said push rod is pushed upwardly.

5. A vibration monitor of the type defined in claim 1 for use with rotating machinery, comprising a casing, lever means within said casing adapted to transmit a blow from without said casing to electrical contact means within said casing, and a push rod extending outwardly from said casing and adapted to have its extreme outer end to engage a rotatable machine part, the lowermost of said levers engaging the upper end of said push rod, the lower end of said casing being seated in a base ring provided with calibrations therearound, said base ring being fitted for vertical adjustment in a fixed base, the uppermost of said series of levers serving to pass an electric charge to a point exteriorly of said casing when said push rod is pushed upwardly.

6. A vibration monitor of the type defined in claim 1 for use with rotating machinery, comprising a casing, a series of levers within said casing, one above the other, and a push rod extending out of said casing and adapted to have its extreme outer end to engage a rotatable machine part, the lowermost of said levers being adapted to engage the upper end of said push rod, the lower end of said casing being seated in a base ring provided with calibrations therearound, said base ring being fitted for vertical adjustment in a fixed base, the uppermost of said levers being adapted to release a charge of power to the exterior of said casing when the push rod is pushed upwardly resulting from vibration in the machine part engaged by said push rod, the mechanism for passing a charge exteriorly including a cylinder, a reciprocating valve piston in said cylinder, an inlet pipe for fluid pressure leading to said cylinder, and an exhaust pipe leading from said cylinder to perform work.

7. A vibration monitor of the type defined in claim 1 for use with rotating machinery, comprising a casing, a series of levers within said casing, one above the other, and a push rod extending out of said casing and adapted to have its extreme outer end to engage a rotatable machine part, the lowermost of said levers being adapted to engage the upper end of said push rod, the lower end of said casing being seated in a base ring provided with calibrations therearound, said base ring being fitted for vertical adjustment in a fixed base, the uppermost of said levers being adapted to release a charge of power to the exterior of said casing when the push rod is pushed upwardly resulting from vibration in the machine part engaged by said push rod, the mechanism for passing a charge exteriorly including a cylinder, a reciprocating valve piston in said cylinder, an inlet pipe for fluid pressure leading to said cylinder, grooves extending lengthwise of the valve piston on opposite sides thereof and lengthwise of the valve piston and a groove extending around the periphery of said valve piston providing communication between said longitudinal grooves, and an exhaust pipe leading from said cylinder to perform work.

References Cited

UNITED STATES PATENTS 2,807,952   10/1957   Bochan et al. ____ 200—61.45 X
3,089,929   5/1963   Murphy _____ 200—61.45

ROBERT K. SCHAEFER, *Primary Examiner.*

ROBERT A. VANDERHYE, *Assistant Examiner.*

U.S. Cl. X.R.

200—61.41